United States Patent [19]

Liang et al.

[11] Patent Number: 5,790,131
[45] Date of Patent: Aug. 4, 1998

[54] SYSTEM AND METHOD FOR LOSSY COMPRESSION OF DATA WITH OUTPUT FILE SIZE CONTROL

[75] Inventors: Gang Liang, Norcross; Stephen Demko; Jarkko Kari, both of Atlanta; Keshi Chen, Dunwoody, all of Ga.

[73] Assignee: Iterated Systems, Inc., Atlanta, Ga.

[21] Appl. No.: 648,345

[22] Filed: May 15, 1996

[51] Int. Cl.$^6$ ............................................. G06F 15/00
[52] U.S. Cl. ............................................. 345/439
[58] Field of Search ..................... 345/439, 433, 345/434, 432, 127, 128, 129

[56] References Cited

U.S. PATENT DOCUMENTS

| | | | |
|---|---|---|---|
| 5,548,698 | 8/1996 | Smith et al. | 395/139 |
| 5,608,853 | 3/1997 | Dujari et al. | 345/439 |

OTHER PUBLICATIONS

"Best Wavelet Packet Bases in a Rate–Distortion Sense", IEEE Transactions on Image Processing, Kannan Ramchandran and Martin Vetterli, vol. 2, No. 2, Apr. 1993.

Primary Examiner—Phu K. Nguyen
Attorney, Agent, or Firm—Morris, Manning & Martin, L.L.P.

[57] ABSTRACT

A system and method compresses datasets so compressed representations corresponding to a predetermined target file size are generated. The system includes a lossy compressor which selects a compressed representation for components of an original data set. The size of the compressed representations generated by the compressor are measured and used with the cost parameters for a parameterized non-linear relationship between cost parameter and compressed representation sizes. The parameters may be used to adjust the cost parameter so the compressor generates compressed representations that correspond to a target size. The adjustment of the cost parameter causes the compressor to select different compressed representations for the components of the original dataset and correspondingly alters the size of the compressed representation.

26 Claims, 5 Drawing Sheets

SYSTEM AND METHOD FOR LOSSY COMPRESSION OF DATA WITH OUTPUT FILE SIZE CONTROL

FIELD OF THE INVENTION

This invention relates to lossy compression methods, and more particularly, to lossy compression methods used to generate compressed files within output file size constraints.

BACKGROUND OF THE INVENTION

The use of lossy compression techniques to represent a set of data is well known. These techniques are typically used to compress one-dimensional data such as audio signals and two (sometimes three) dimensional data such as images or other graphical data. These techniques include fractal compression methods, discrete cosine transform (DCT) methods, wavelet methods, motion compensation methods, and vector quantization (VQ) methods. The DCT method commonly used is the one which conforms to JPEG standards.

These lossy compression methods divide or segment a data set into components, such as blocks. They then determine a representation which approximates the components comprising the original data set. For example, in the DCT method, the compressor determines coefficients of a cosine function which best represent the blocks comprising the original data set. In a similar manner, the wavelet methods also determine coefficients for wavelet functions which may be used to represent components of the original data set. In fractal methods, affine mapping transformation functions are used to represent the components of the original data set in terms of other elements of the data set. In all of these methods, coefficients for functions which represent the original data set are determined and, in some cases, residual or other representation adjustments are determined to better correlate the compressed representation to the original data set. The coefficients determined in these methods usually require fewer bits to represent the original data set. Further, coefficients for one component of the original data set may be expressed as a differential value of the coefficients of another data set and other compression efficiencies may be obtained.

While each of these methods may generate a compressed representation of a data set which is smaller in size than the original data set, there is currently no way to constrain the size of the compressed representation and maintain consistency in the fidelity of the compressed representation to the original data set. In many applications, the size of the compressed representation is a very important factor. For example, if the compressed representation of a data set being compressed is to be communicated across a communication conduit to another site, the compressed representation needs to be of a size that corresponds to the bandwidth of the communication conduit. That is, if the compressed representation is very large and the communication conduit does not support very high transmission rates, the time to transport the compressed representation may be too great to be tolerated for a particular application. For example, a twisted pair telephone line is frequently used to couple a user's computer at a home to the Internet network. While communication between servers on the network may support very high bandwidth communication (for example, a T1 or T3 line), the communication link between a user site and a server usually includes a twisted pair telephone line which has a relatively low bandwidth. Thus, the transfer of a compressed representation from a server to a user's computer may take a relatively long time and discourage the user from attempting to access files from server sites.

Each of the methods discussed above have a number of parameters which affect the size of a compressed representation generated by a compressor and the fidelity of the data set regenerated by a decompressor. These factors include the size of the components into which the original data set is segmented, the degree of accuracy with which the coefficients are represented, and other related factors. In compressing the data, a compressor varies a number of these parameters to determine a compressed representation which is the best. Frequently, the best representation is determined by evaluating the amount of error between the original data set and the data set which may be generated from a compressed representation. When an error or distortion measurement alone is used to evaluate the compressed representations generated by a compressor, the compressed representation size, also called output file size, may vary widely. This variation is caused by the nature of the data within a data set. As is well known, data sets having many redundant data elements are more efficiently compressed than those having fewer redundant data elements. As a result, a data set having fewer redundant elements within it usually requires more coefficients to accurately represent the data set than an original data set having many redundant elements. Consequently, if a compressor only uses an error measurement to evaluate the compression of a data set, the compressed representation may approximate or even exceed the size of the original data set. In such a case, the communication of the compressed representation produces no appreciable savings over communication of the original data set. For example, if the data sets are frames in a video sequence, a viewer may perceive a choppy and disjointed view of the images in the frames as smaller compressed representations are more quickly decompressed and displayed than the larger compressed representations.

In an effort to prevent the decompression of the largest compressed representation from affecting the use of the decompressed sequence, the error rate may be adjusted upwardly. While this probably reduces the size of the compressed representations generated, the fidelity of the regenerated images may correspondingly degrade. As a result, the reproduction of the images at the receiver site may not be deemed adequate for a particular application. On the other hand, if the size of the compressed representation is set to a predetermined maximum and error is ignored, the quality of the images regenerated from the compressed representations varies too widely to be useful for most applications.

In an effort to control the amount of data used to represent an original data set and still maintain relative consistency in the quality of the regenerated data sets, a cost function which relates error and size of a compressed representation to one another has been previously used to evaluate which compressed representations for components of a data set optimize data set fidelity without sacrificing compression efficiency. This cost function may be described mathematically as a Lagrangian cost function $C=D+\lambda R$ where R is the number of bits for a representation, D is a distortion measurement and C is a total cost of representing an original data set with R bits. From the equation, C is a function of the accuracy of the representation and the number of bits required for the compressed representation. The Lagrangian multiplier $\lambda$ is the absolute value of the slope of a tangent line to a rate/distortion curve. Such rate/distortion curves are well-known. By selecting $\lambda$ to be at a tangent point on the curve, an optimal rate/distortion combination for a data set may be achieved.

A typical distortion/compressed representation size curve is a convex curve in the first quadrant of a Cartesian plane, with distortion measurements corresponding to the y-axis and output file size corresponding to the x-axis. The curve represents the general relationship that as the amount of data used for a data representation increases, the distortion decreases and vice versa. However, as the size of the data representation increases, the improvement in distortion from one data representation to another may not be significant enough to justify the extra data required for the second representation. To evaluate whether one representation is better than another, the cost of the two representations are compared. This may be represented mathematically as: $\Delta C=(D_1-D_2)+\lambda(R_1-R_2)$. Where $D_2<D_1$ and $R_2>R_1$, the cost differential is positive or negative depending on whether the distortion difference is larger than the size difference times the Lagrangian multiplier. If it is larger, the cost differential is positive and the second representation is better since less distortion has been achieved at an efficient increase in size. Otherwise, the improved distortion came with an inefficient increase in size. Of course, if there is no improvement in distortion with increased size the second compressed representation is also not selected. The selection of $\lambda$ in the cost function is important in the balancing between distortion and size of a compressed representation.

In known systems, a value for $\lambda$ is selected based on a priori knowledge of the data sets to be compressed and the resulting cost function is used to select between different representations of a data set the one which best represents the data set. Another value for $\lambda$ is then selected and the best representation for the data set based on the new cost function is determined. Various values of $\lambda$ may all be evaluated and the best representation for each $\lambda$ are compared and the one having the lowest distortion or compressed representation size is used to represent the data set. The criterion used for this selection between best representations generated by different $\lambda$ depends on the application in which the compressed representation is to be used. This type of exhaustive evaluation to determine a best representation from various values of $\lambda$ cannot be used for real-time applications such as video sequences since the time to process all of the $\lambda$ values usually prevents the generation of a best compressed representation within the time available between frames. Even for non-real-time applications, this approach is not optimal since it decreases the number of data sets which may be processed if an effective $\lambda$ could be found more efficiently.

One solution has been to develop methods which more quickly converge to a $\lambda$ value which corresponds to a predetermined compressed representation size. These methods generally seek a value for $\lambda$ by selecting a $\lambda$ value on a known distortion/representation size curve which is thought to correspond to a desired compressed representation size. This value of $\lambda$ is then used to compress a data set and the resulting compressed representation size is compared to a target range about the desired compressed representation size. If it is within the target range, the compressed representation is used. Otherwise, another $\lambda$ value is selected which is thought to correspond to the desired compressed representation size. This $\lambda$ value is used to compress the data set and the size of the resulting compressed representation is compared to the target range. If the size is outside of the target range, the two $\lambda$ values are used to define a linear relation between $\lambda$ and compressed representation size in the area of the desired representation size. Methods are then used to attempt to locate a $\lambda$ which corresponds to this linear relationship which results in a compressed representation having a size in the target range. Bracketing methods, such as bisection, are used to converge to a value of $\lambda$ which corresponds to the identified linear relationship.

These methods for determining $\lambda$ have a number of limitations. For one, the linear relationship only approximates the $\lambda$-compressed representation size relationship since empirical data shows that $\lambda$ is not a linear function of R. Consequently, the linear approximation does not accurately describe the $\lambda$-R relationship. Another limitation is that the linear relationship is only helpful for a small region of the $\lambda$-R relationship. While a curve may be modeled by straight lines for a small region, extrapolation of that linear relationship outside the small region causes the $\lambda$ values corresponding to the linear relationship to increasingly diverge from the non-linear $\lambda$-R function. Thus, if the target range shifts significantly, for example, frame rate doubles, then seek and find methods have to attempt to locate a linear region corresponding to the new target range and find an appropriate $\lambda$ value in that target range. During this adjustment, the compressed representations may be inadequate for the application in which they are being used. This adjustment problem may also occur when the content of a next frame in a sequence changes appreciably, and the $\lambda$-R relationship significantly shifts for the new data set contained in the next frame. This shift may make the location of a linear range which corresponds to the new $\lambda$-R relationship difficult to find.

In many applications, the size of the compressed representation is an important parameter. For example, in image compression of a single image, the size of the compressed representation must be constrained to an upper limit so that the compressed representation complies with the restraints of a communication conduit. A more frequently encountered example is a video sequence in which frames of image and soundtrack data are compressed for transmission over a communication conduit having a fixed bandwidth to a remote site. This type of application has a number of compression constraints. For one, the time available for compression is generally limited to the time between frames. Another constraint is that the source of the frames produces the frames at a fixed number of frames per unit of time. Accordingly, each compressed representation must average a size which comports with the upper limit of the communication conduit bandwidth. Even if the average size of the compressed representation comports with the upper limit of the communication conduit bandwidth, the variation in size between compressed representations should not exceed a range about the upper limit of the communication conduit. This constraint on the variance between compressed representations arises from the requirement that the regeneration of data sets or frames at the receiving site should be at a steady rate so the generation of images is smooth. Otherwise, the display of the regenerated images may appear to "freeze" frames or prevent proper synchronization between the soundtrack and video portions of the video sequence.

Present methods used to overcome these problems include buffering of the compressed representations at the receiving site. Buffering is the use of memory to store a plurality of decompressed images to smooth out the differences between the decompression time required between compressed representations. However, the synchronization between the generation of the audio portion of the sequence and the video frames of the sequence cause latency problems. Attempts to overcome this problem by simply increasing the size of the buffers for the decompressed data sets eventually reaches a point where the cost of the additional memory is prohibitive.

What is needed is a method of computing $\lambda$ which converges more quickly to a value that is useful for selecting compressed representations when the content of data sets being compressed changes significantly.

What is needed is a method of computing λ for a sequence of data sets generated at a predetermined rate.

What is needed is a way of evaluating the compression of a data set without requiring iterative compression of the frame.

SUMMARY OF THE INVENTION

The above limitations of previously known systems and methods are overcome by a system and method made in accordance with the principles of the present invention. The method of the present invention includes selecting a predetermined parameterized non-linear relationship between compressed representation size and a cost parameter, selecting a cost parameter value for the cost parameter, compressing an original data set using the selected cost parameter value, measuring the size of the compressed representation, determining a set of parameters for the parameterized non-linear relationship from the selected cost parameter value and corresponding compressed representation size, adjusting the cost parameter value in correspondence with the determined parameters for the predetermined parameterized non-linear relationship and continuing the compressing, measuring, determining and adjusting steps until the compressed representation corresponds to a selected target size. The parameterized non-linear relationship may be of the form $R=\alpha+\beta\lambda^{-1}+\gamma\lambda^{-2}+\eta\lambda^{-3}$ where the parameters $\alpha, \beta, \gamma$ and $\eta \geq 0$, R is a compressed representation size and λ is a cost parameter corresponding to the compressed representation size. Preferably, the parameterized non-linear relationship is an exponential curve of the form $R=\alpha\lambda^{\beta}$ where α and β are the parameters.

In the present invention, the cost parameters and corresponding compressed representation sizes are fitted to a parameterized non-linear relationship to estimate the parameters of the relationship and define the non-linear λ-R relationship over most of the range of operation for compression of data sets. Since the relationship is defined for almost the entire range, any change in a target range may be substituted in the parameterized relationship to quickly determine a cost parameter for the new target range. As compressed representation sizes and adjusted cost parameters are generated in the new target range, the parameters of the parameterized relationship are adjusted to more quickly provide cost parameter values which correspond to the new target range than known seek and locate linear methods. By determining the parameters for the parameterized non-linear relationship which correspond to the cost parameters and compressed representation sizes being generated by the compressor, the compressor operation may be more easily adapted to generate compressed representations in a target range.

The parameters of the present invention may be determined in an iterative method operating on the same data set or data set component for applications in which timing constraints do not prevent processing of a data set more than once. The method and system of the present invention more quickly converges to a cost parameter/compressed size representation (λ-R) relationship which constrains the compressed representation size to a predetermined target range. In applications where there are timing constraints, the parameters may be determined by using cost parameters and corresponding compressed representation sizes for data sets or components of a data set previously compressed. Consequently, the parameters of the parameterized non-linear relationship may be updated after each data set or component compression so a cost parameter for a next compression may be determined from the updated relationship. The parameters may be determined by fitting cost parameters and corresponding compressed representation sizes for data sets or components of data sets previously compressed to the parameterized non-linear relationship using any known curve fitting technique. Preferably, the fitting technique is a least squares fitting.

The cost parameter values and compressed representation size may be stored in memory and used to determine the parameters of the parameterized relationship. The more recent cost parameters and corresponding compressed representation sizes may be weighted so their contribution to the determination of the parameters is more significant than more distant cost parameters and corresponding compressed representation sizes. The term "recent" may mean close to the current cost parameter and corresponding compressed representation size in a temporal or spatial sense. The storage of all prior cost parameters and corresponding compressed representations to perform a fitting after each data compression usually requires more storage and computational resources than may be available in most compressor systems. Preferably, a sequential least squares fitting method is used in which a set of values representing the parameters previously determined from cost parameters and compressed representation sizes are maintained in memory. A current cost parameter and corresponding compressed representation size are then used to update the stored set of values so new parameters for the non-linear relationship may then be determined. In this manner, the non-linear relationship is updated with each compression of a data set or component of a data set. Most preferably, a sequential weighted least squares method is used which weights the contribution of recent cost parameters and corresponding compressed representation sizes so they contribute more to the determination of the parameters for the non-linear relationship than distant ones. Again, "recent" may refer to cost parameters and corresponding compressed representation sizes in a temporal or spatial sense.

The system and method of the present invention is especially useful when data sets are related to one another. This relationship may be adjacent frames in a video sequence, similar components in a data set being compressed by a compression method which segments a data set, or related areas in data sets, for example. Related areas may be, for example, a portion of an image represented by a group of data set components which does not change very much such as the sky in an outdoor scene. The advantage of the methods of the present invention is that the parameters for separate parameterized non-linear relationships may be determined for related areas within a data set or in different data sets so that an adjusted cost parameter may be tuned for each related area. By using different target ranges for each related area, efficient compression in relatively simple areas may be used to adjust target ranges, and correspondingly, compressed representation sizes in other related areas. The target ranges for each related area are correlated to the target range for the overall data set.

The process of the present invention is implemented by a system having a compressor for compressing a data set with a lossy compression method, a compressed representation size evaluator, a parameter generator for determining parameters of a parameterized non-linear relationship, and a cost parameter adjuster for adjusting said cost parameter in correspondence with the parameters of the parameterized relationship between cost parameter and compressed representation size. Such a system adapts the cost parameter to the data being compressed by the system so the compressed representations generated by the system correspond to a target range while maintaining regenerated data set fidelity to the data set.

The system and method for the present invention may be implemented in any compressor implementing a lossy compression method. Since these types of compressors segment a data set into a plurality of components and then evaluate a representation for each component, the operation of these compressors may be modified by adding the components of the present system to such compressors. By adding these components to known compressors, the compressors evaluate the costs of data representations according to cost functions which incorporate the adjusted cost parameters so the compressed representations for the components of the data set correspond to the target range for the overall data set. Thus, they generate compressed representations of data sets which correspond to a predetermined target size range and error constraint for an application. By correlating the compression of the components of the data sets through a cost parameter which is modified in correspondence with the size of data representations generated for the components, the error in the regenerated data sets and the size of the compressed representations approximate the target compressed representation size while maintaining reliable accuracy in the regeneration of the data sets. By maintaining compressed representation size within a range about the target size, the compressed representations substantially reduce the latency problems which occur in previously known systems Most preferably, the cost parameter is the Lagrangian multiplier $\lambda$ for the cost function noted above. In the present invention, the multiplier $\lambda$ is adjusted based on the parameters determined for the non-linear relationship which were determined from cost parameters and corresponding compressed representation sizes resulting from previous data set or data set component compressions. This reliance on the parameterized relationship between the cost parameter and compressed representation size to adjust the value of the cost parameter reduces the computational resources needed for the cost parameter determination. As a result, the present invention supports the modification of the cost parameter during compression of a video sequence or components of a video frame. The quick convergence of the cost parameter using the methods of the present invention also cause the compressed data representations to correspond more closely to the target compressed representation size range.

The system and method of the present invention provide consistent fidelity in the regenerated data sets while maintaining compressed representation file size in a predefined range about a target file size. By selecting the target file size so that it corresponds to the bandwidth for a communication conduit, consistent reproduction quality which conforms to the constraints of the communication conduit are generated. As a result, a compressor may be adjusted for different applications and communication environments. This compressor adjustment system and method may be used with any type of lossy compressor which evaluates the compressed representation for components of a data set by using some type of accumulated error measurement for the components. Preferably, the error measurement is an absolute value difference or squared value difference measurement.

These and other benefits and advantages of the present invention will be discerned from the detailed specification viewed in light of the accompanying drawings.

BRIEF DESCRIPTION OF THE DRAWINGS

The accompanying drawings, which are incorporated and constitute a part of this specification, illustrate embodiments of the invention and, together with the general description given above, and the detailed description of the embodiments given below, serve to explain the principles of the invention.

DETAILED DESCRIPTION OF THE PRESENT INVENTION

Figure 1:
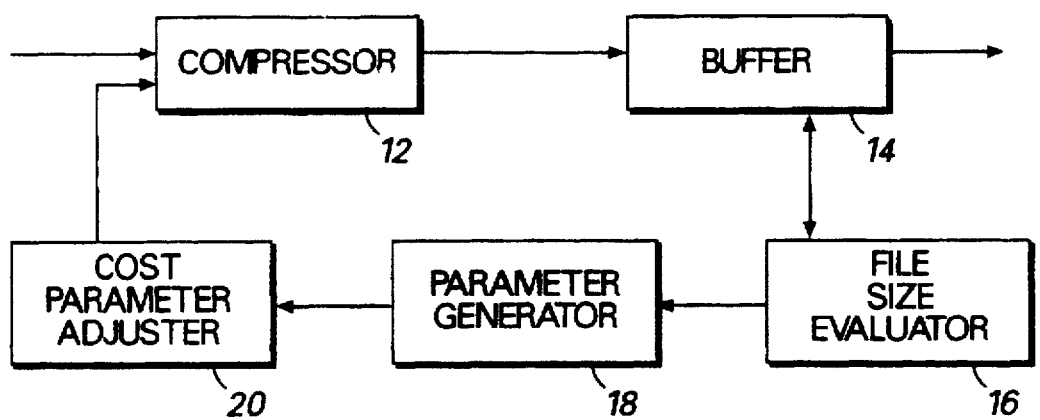
FIG. 1 is a block diagram of a system implementing the method of the present invention.

A system which implements the method of the present invention is shown in FIG. 1. System 10 includes a compressor 12 having its input coupled to a source for data sets (not shown) and its output coupled to a storage buffer 14 and a file size evaluator 16. Buffer 14 is for storage of a compressed representation generated by compressor 12. Size evaluator 16 is also coupled to a parameter generator 18 and a cost parameter adjuster 20. Cost parameter adjuster 18 is coupled to compressor 12. Preferably, compressor 12 is implemented in a computer program written in the C programming language. The program executes on a personal computer having an Intel 80486 processor supported by 8 MB of RAM and at least 340 MB of hard disk storage. Preferably, buffer 14 is comprised of data elements in the RAM space for the personal computer.

Compressor 12 generates compressed representations of a data set or data components. The representations generated are selected in accordance with a cost measurement such as the Lagrangian cost function $C=D+\lambda R$ previously discussed. Distortion measurement D is any well known error measurement between a component of a data set and the regenerated data set corresponding to the compressed representation. This distortion measurement may be any well known measurement such as a difference squared measurement or the like. Compressor 12 uses a cost parameter provided by cost parameter adjuster 20 to generate a size value related to the size of a compressed representation for a data set or component. Compressor 12 combines the distortion measurement and size value to generate an overall cost for a compressed representation of a component or data set. Using the overall cost, compressor 12 selects a compressed representation which corresponds to the smallest overall cost measurement and sends the selected compressed representation to buffer 14. File or compressed representation size evaluator 16 measures the size of the compressed representation and provides the size to parameter generator 18.

Parameter generator 18 then uses the cost parameter and the compression representation size resulting from the use of the cost parameter to generate parameters for a parameterized non-linear relationship. Using a target size and the generated parameters, the cost parameter may be adjusted for compression of a data set or data set component.

Figure 2:
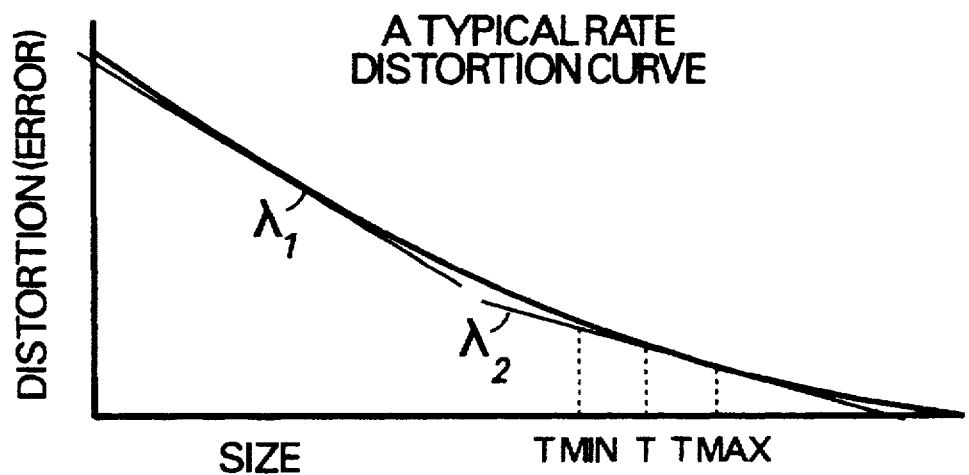
FIG. 2 is a graphical depiction of an error/file size curve showing tangent lines in an area of interest corresponding to a target file size.

FIG. 2 shows a error/compressed representation size curve. These curves are well known and are developed from empirical observation of a compressor compressing original data sets. The horizontal axis of the graph corresponds to compressed representation file size and the vertical axis of the graph corresponds to error between the regenerated data set of a compressed representation and the original data set. A set of tangent lines to this curve are also shown in FIG. 2. These lines show the relationship between the change in error and the change in file size of a compressed representation corresponding to that change in error. The point T in FIG. 2 represents a target file size and the points $T_{max}$ and $T_{min}$ represent a maximum and minimum file size, respectively, for a particular application or communication conduit. By using a cost measurement having a cost parameter which correlates the change in error to change in file size represented by the tangent lines in FIG. 2, a compressor may generate compressed representations of the components of the data set so the file size of the compressed representation of the data set falls within the range about the target file size without sacrificing accuracy of the representation.

Lossy compressor 12 may implement any lossy compression method which segments an original data set into components and then determines a compressed representation for each component. These methods include, without limitation, fractal, wavelet, discrete cosine transform, motion compensation spline and piecewise polynomial methods. These methods accumulate a distortion for each component and the sum of these error measurements represent a total error for the compressed representation. In order for the accumulated error to so represent the total error for a compressed representation, it should be positive. Preferably, the error measurement used by compressor 12 is an accumulated absolute difference measurement or a difference squared measurement. These measurements are well known in the art. Previously known systems have used such error measurements as a criteria for selecting between two compressed representations of a component of a data set. The two different compressed representations are generated by varying compression method parameters, such as block size or coefficient representation accuracy.

As indicated by the curve in FIG. 2, dependency on the improvement in error alone would cause the more accurate representation to be selected, however, that may result in a file size which lies outside of the range about the selected target size. Even if an error threshold is selected which corresponds to a predetermined size, the error axis of FIG. 2 represents accumulated error. Thus, the first components compressed by the compressor may achieve a high degree of accuracy while later components processed by the compressor are represented less accurately because the earlier process components have absorbed most of the permitted file size. The disparity in size between some components gives rise to latency problems, even when buffering is used. The present invention overcomes this problem by (1) using the cost parameter and corresponding compressed representation size for a previously compressed component or data set to determine the parameters for the parameterized non-linear relationship and (2) adjusting the target rate used with the non-linear relationship to determine the cost parameter for compressing a component or data set. As a result, consistency between the compressed representations of the component parts is achieved with improved computational efficiency and the compressed representation for the entire data set has a size which corresponds to the target size.

In the present invention, the cost parameter $\lambda$ is defined by a relationship between the cost parameter and the size of the compressed representation generated by using the cost parameter. When two compressed representations for a component of a data set are determined, their costs may be compared to determine which representation is better. By compressing all of the components using a particular $\lambda$ value, the overall compressed representation of the data set corresponds to the cost parameter $\lambda$. By changing the cost parameter $\lambda$, the compressor compresses the components differently since the costing measurement changes and different compressed representations for the components are selected. Thus, by controlling $\lambda$, compressor 12 may be made to generate compressed representations until one falls within the permitted file size which corresponds to the target file size. By selecting $\lambda$ according to the method of the present invention, the parameters for a parameterized non-linear relationship are determined so the resulting relationship and target size may be used to adjust the cost parameter. The adjusted cost parameter causes compressor 12 to generate a compressed representation that corresponds to the target file size more quickly. One method of controlling the cost parameter $\lambda$ is performed in accordance with the relationship of: $l_i * \lambda_i^n = l_j * \lambda_j^n = K$ where the exponent n is a real positive number and K is a constant. By using a target file size $l_T$, an initial value for $\lambda_0$ and $n_0$ is selected. These values are used by parameter generator 18 and cost parameter adjuster 20 to provide an adjusted cost parameter $\lambda$ to compressor 12.

Using the cost parameter $\lambda$ provided by parameter adjuster 20, compressor 12 generates a compressed representation for an original data set. The size of this original data set is evaluated by file size evaluator 16 to determine whether it lies within the range corresponding to the target file size. If it is not, it is used to established an upper or lower bound for the cost parameter. If it is outside the corresponding range for the target file size, K is updated as $K=l_1*\lambda_0^{n_0}$ and a $\lambda_1$ is computed in accordance with the equation: $(K/l_T)^{1/n_0}$. This new cost parameter is provided by cost parameter adjuster 20 to compressor 12 which generates a second compressed representation. The second compressed representation differs from the first compressed representation because the costing function has changed. Following generation of the second compressed representation, K is updated and $\lambda_2$ is computed as $\lambda_1$ was. Having computed two $\lambda$ based upon two actual compressions of the original data set, the exponent parameter n may now be computed according to the equation $n=\log(l_1/l_2)*(\log(\lambda_1/\lambda_2))^{-1}$. Using the non-linear relationship given above with a target size and the determined exponent, a new cost parameter $\lambda$ is determined for the next compression of a data set or component. By using the determined exponent parameter n and a target file size, the parameterized relationship may be used to adjust the cost parameter to almost any target size in the operating range of compressor 12.

Figure 3:
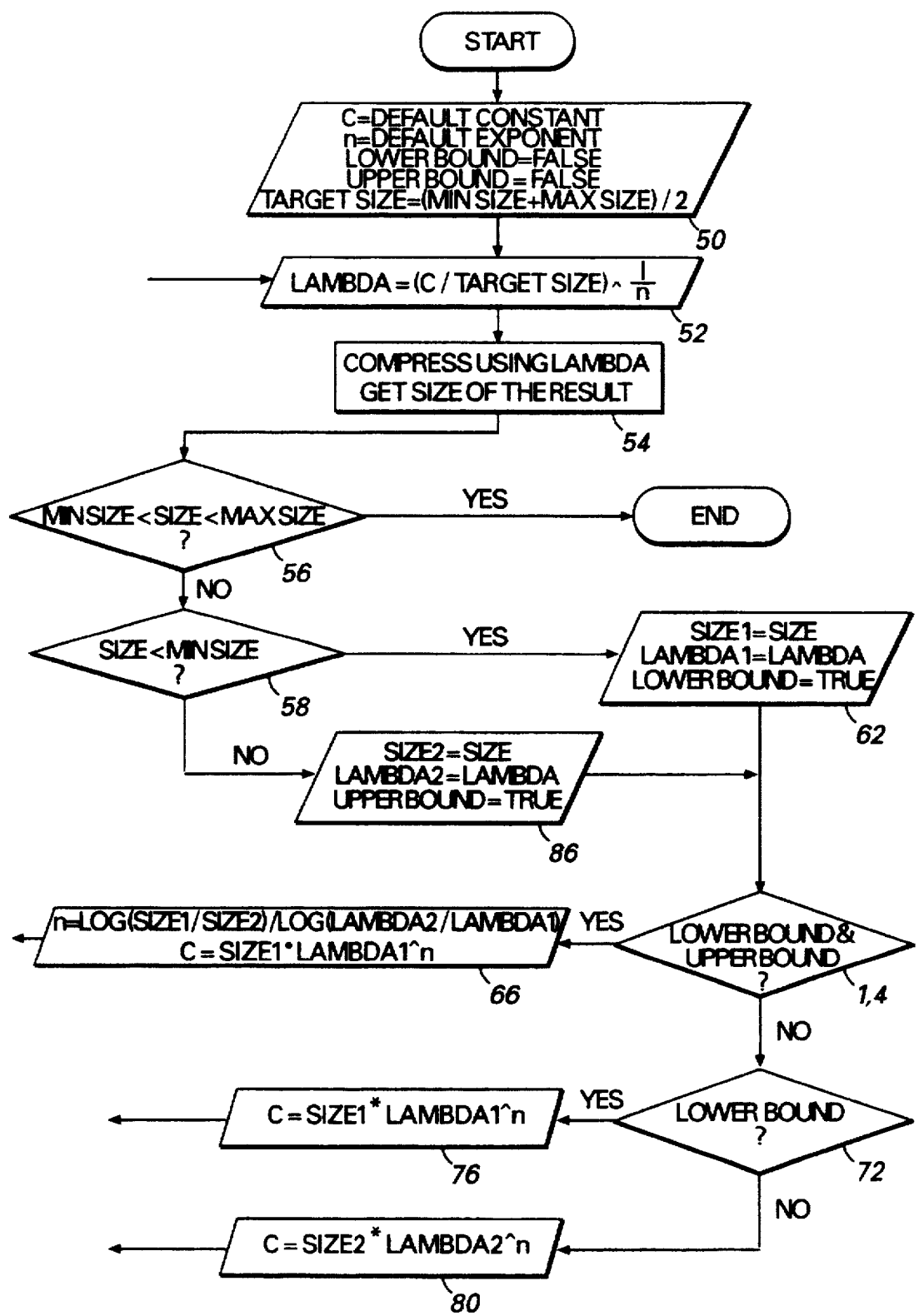
FIG. 3 is a flow chart of a method of the present invention implemented for a compressor which iteratively compresses an original data set until the determined parameters for the non-linear relationship produce an adjusted cost parameter which result in a compressed representation of the original data set that corresponds to the target size.

A flow chart depicting the preferred exponential process of the present invention for iterative compression of a data set is shown in FIG. 3. The process relates the cost parameter $\lambda$ to compressed representation size R according to the parameterized relationship $R=\alpha\lambda^\beta$. The process using this relationship for iterative compression begins by initializing the values for the process (Block 50). These values include a default constant C and a default exponent n which are based upon an empirically determined error/file size curve for the compressor 12. The lower and upper bound variables are, preferably, Boolean values used to indicate whether an upper or lower bound for the process has been established. Target size is initialized to a mid-point value between the minimum and maximum file size to establish a target range. Preferably, the minimum and maximum file size correspond to a file size which may be transmitted over a communication conduit so that the file size conforms to the bandwidth of the communication conduit. Using the initial values, cost parameter adjuster 20 computes an initial cost parameter $\lambda$ for compressor 12 (Block 52). This computation corresponds to the equation used for $\lambda_1$ noted above. Compressor 12 then generates a compressed representation of a data set (Block 54). This compressed representation is presented to buffer 14 and to file size evaluator 16. Size evaluator 16 then determines whether the file size of the compressed representation lies between the minimum and maximum file size (Block 56). If it does, the compressed representation conforms to the constraints of the communication conduit or application and size evaluator 16 generates a signal to buffer 14 so that the compressed representation is provided as output from the system. An effective value for $\lambda$ is also established by this procedure. If the file size of the compressed representation is less than the minimum file size (Block 58), the process adjusts the lower bound to the size of the current compressed representation, the cost parameter is stored and the lower bound flag is set to TRUE (Block 62). This process assumes that the $\lambda$-R relationship is montonically decreasing in order for the process to converge. For relationships not conforming to this criterion, the process would need to check for values which reduce the lower bound below a previously determined value and reject those values.

The process continues by determining whether both the lower and upper bound had been set (Block 64). If both the lower and upper bound had been previously set, a new exponent n is computed based upon the size of the current lower and upper bound and their corresponding cost parameters $\lambda$. Using this value of n a new constant may then be computed (Block 66). If only one boundary has been set, the process determines whether it is the lower or upper bound (Block 72). If it is the lower boundary, a new constant value is computed based upon the size of the compressed representation which established the lower boundary and its corresponding cost parameter $\lambda$ (Block 76). Otherwise, a new constant is computed based upon the size of the compressed representation which established the upper boundary and its corresponding cost parameter $\lambda$ (Block 80). If the file size of a current compressed representation was greater than a minimum file size, the current compressed representation is used to set an upper bound compressed representation file size and establish a $\lambda$ for the upper boundary (Block 86). This process assumes that the $\lambda$-R relationship is montonically decreasing in order for the process to converge. For relationships not conforming to this criterion, the process would need to check for values which increase the upper bound above a previously determined value and reject those values.

The system and method of the present invention may also be used in applications where an data set may not be compressed more than once. Usually, these types of applications involve the generation of a sequence of original data sets which are related to each other. For example, a video camera generates frames of data which are related to one another since the frame rate for the camera typically means that the area within the field of the view of the camera does not change much from one frame to the next. In these types of applications, the time between data sets which may be used to generate a compressed representation may not permit more than one compression. However, because the data content of the frames are related to one another, the adjustment of the cost parameter through the parameterized non-linear relationship "tunes" the compressor to the redundant content of the frames of the sequence.

Figure 4:
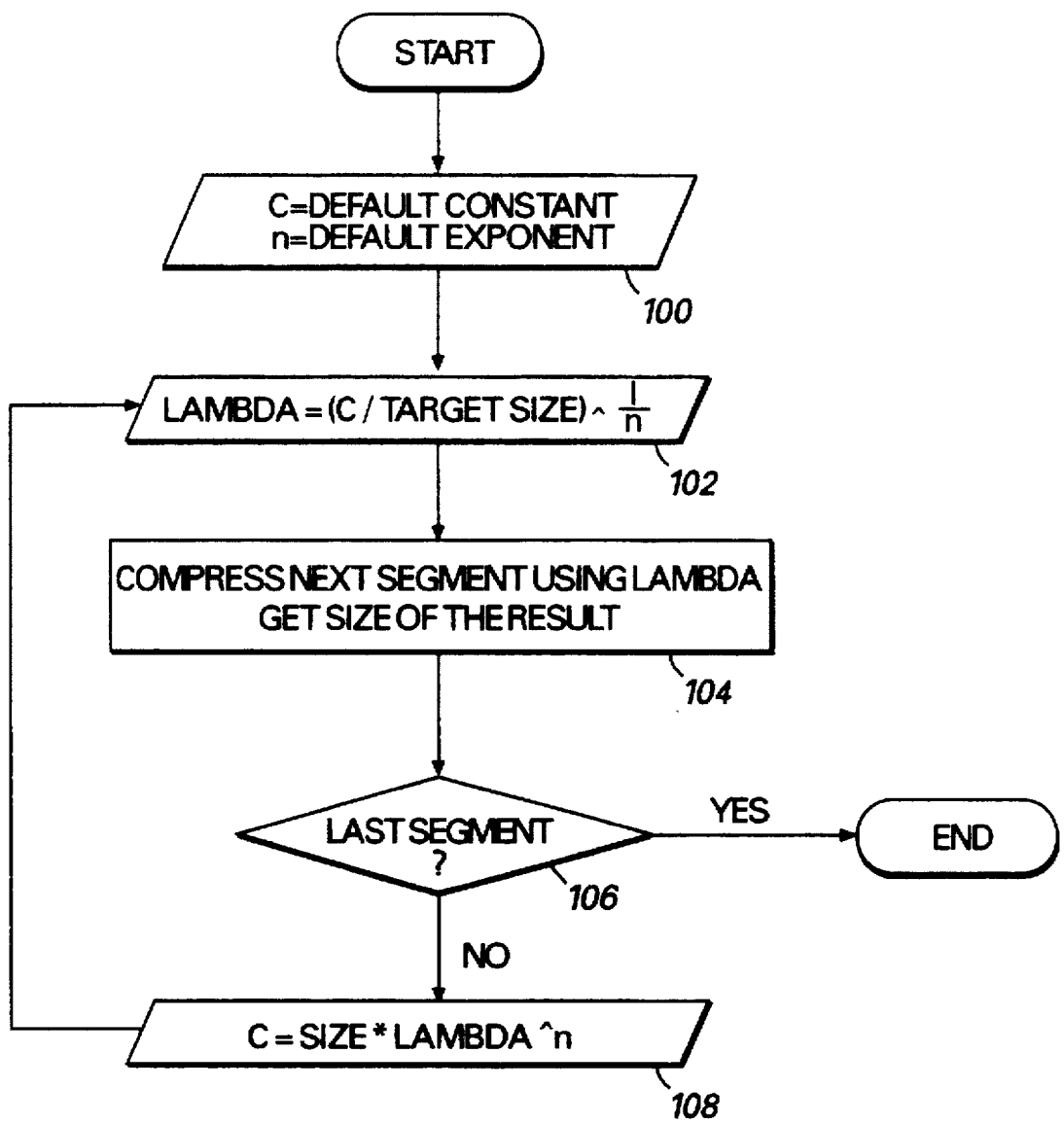
FIG. 4 is a flow chart of a method of the present invention which adjusts the cost parameter according to an exponential relationship in which the exponent is a predetermined constant value.

The preferred process relating the cost parameter to compressed representation size as $R=\alpha\lambda^\beta$ for applications where time constraints only allow one compression of the original data set is shown in FIG. 4. This process holds the exponent value constant while adjusting the cost parameter. The process again begins by setting the constant C and exponent value n to default values (Block 100). Preferably, these values correspond to an empirically established error/ frame size curve for the compressor. A cost parameter $\lambda$ is then computed (Block 102) and provided to compressor 12. Compressor 12 generates a compressed representation of an original data set (Block 104) and the compressed representation is provided for the application or communication conduit. The process then determines whether another original data set is available for compression (Block 106). If it is not, the process terminates. Otherwise, a new constant C is computed in accordance with the non-linear relationship and the cost parameter $\lambda$ is correspondingly adjusted for the compression of the next original data set (Block 102). This process continues until there are no more data sets or components to compress. This process works well as long as there is relationship between the original data sets in a sequence. The redundant data within these types of data sets permits $\lambda$ to be adjusted to a value which corresponds to a target file size. Even when the content from one frame to another differs substantially, the system adjusts so that the data sets which follow thereafter (which should be related) cause the cost parameter to adjust so it conforms to the $\lambda$-R relationship within the new target range and converge to a value that corresponds to the new sequence of data. From empirical data gathered using this process a constant exponent value in the range of 1 to 2 is preferred and, most preferably, the exponent value is in the range of 1.5 to 1.6, although other exponent values may be used depending upon the content of the data sets.

The methods depicted in FIGS. 3 and 4 relate two previous cost parameters and corresponding compressed representation sizes to generate compressed representations which are used to determine a parameter for the non-linear relationship. The non-linear relationship may then be used to adjust the cost parameter for compressing a component or data set. Alternatively, a curve fitting method may be used to determine parameters for a parameterized non-linear relationship by fitting cost parameters and corresponding compressed representation sizes to a parameterized non-linear relationship. Preferably, a least squares method is used to determine the parameters for a parameterized relationship relating cost parameters and compressed representation sizes for previously compressed components data sets. One limitation of known least squares fitting methods is that they require the storage of all previously determined $\lambda$ and l values. In accordance with the principles of the present invention, a sequential least squares fitting method is used to update a set of values which may be used to determine a new $\lambda$. The sequential least squares method does not require the storage of all previously determined coefficients and cost parameters.

The sequential least squares method may be described with respect to a parameterized non-linear curve having the form $R=\alpha\lambda^\beta$ where $\alpha \geq 0$ and $\beta<0$. Taking the logarithm of both sides gives: $\log R = \log\alpha + \beta\log\lambda$. By denoting $y=\log R$, $z=\log\lambda$, $a=\log\alpha$ and $b=\beta$, the non-linear curve may be written as $y=a+bz$. For k previously observed compressions of a data set, the next value of $\lambda$ may be determined by minimizing a, b for:

$$\text{minimize } a, b \sum_{i=0}^{k-1} (y_i - a - bz_i)^2 \quad (1)$$

The estimated (a,b) values from solving the problem may be expressed as:

$$\Theta = (Z^TZ)^{-1}Z^Ty_l \quad (2)$$

where $$\Theta = [a, b]^T, \quad (3)$$

$$y = [y_0 y_1 y_2 \ldots y_{k-1}]^T \quad (4)$$

$$Z = \begin{bmatrix} 1 & 1 & 1 & \ldots & 1 \\ z_0 & z_1 & z_2 & \ldots & z_{k-1} \end{bmatrix}^T \quad (5)$$

and $\sim$ and $[\ ]^T$ denote estimated parameter values and transpose operator, respectively.

This minimization problem requires the storage of the previously observed $\lambda$ and R values for previous compressions. In order to further simplify the computation of a new $\lambda$ let:

$$\Theta_k = [\tilde{a}_k \tilde{b}_k]^T \quad (6)$$

designate the least squares estimate of the $\lambda$-R relationship parameters based on cost parameters and corresponding compressed representations $(z_i, y_i)$, $i=0, 1, 2, \ldots, k$ as:

$$y_k = [y_0 y_1 y_2 \ldots y_k]^{T_1} \quad (7)$$

$$Z_k = \begin{bmatrix} 1 & 1 & 1 & \ldots & 1 \\ z_0 & z_1 & z_2 & \ldots & z_k \end{bmatrix}^T \quad (8)$$

Denote $$P_k = (Z_k^T Z_k)^{-1} \quad (9)$$

where $Z_k^T Z_k$ is a rank one update of $Z_{k-1}^T Z_{k-1}$. Using equation (2):

$$\tilde{\Theta}_k = P_k Z_k^T y_k \text{ and}$$

$$P_k = (Z_k^T Z_k)^{-1} = (Z_{k-1}^T Z_{k-1} + z_k z_k^T)^{-1} = (P_{k-1}^{-1} + z_k z_k^T)^{-1} =$$

$$P_{k-1} - r_k P_{k-1} z_k z_k^T P_{k-1}, \text{ where } z_k = [1 z_k]^T \text{ and}$$

$$r_k = (1 + z_k^T P_{k-1} z_k)^{-1}.$$

This yields:

$$\tilde{\Theta}_k = P_k Z_k^T y_k = P_k(Z_{k-1}^T y_{k-1} + z_k y_k) =$$

$$(P_{k-1} - r_k P_{k-1} z_k z_k^T P_{k-1})(Z_{k-1}^T y_{k-1} + z_k y_k) =$$

$$\tilde{\Theta}_{k-1} + r_k P_{k-1} z_k (y_k - z_k^T \tilde{\Theta}_{k-1})$$

This means that the kth estimate of the parameters for the non-linear $\lambda$-R relationship may be computed by adding an update term determined from a current cost parameter and compressed representation size to the previous estimate $\Theta_{k-1}$. All previously acquired cost parameters and compressed representation sizes are carried in the $\Theta_{k-1}$ vector and $P_{k-1}$ matrix.

Figure 5:
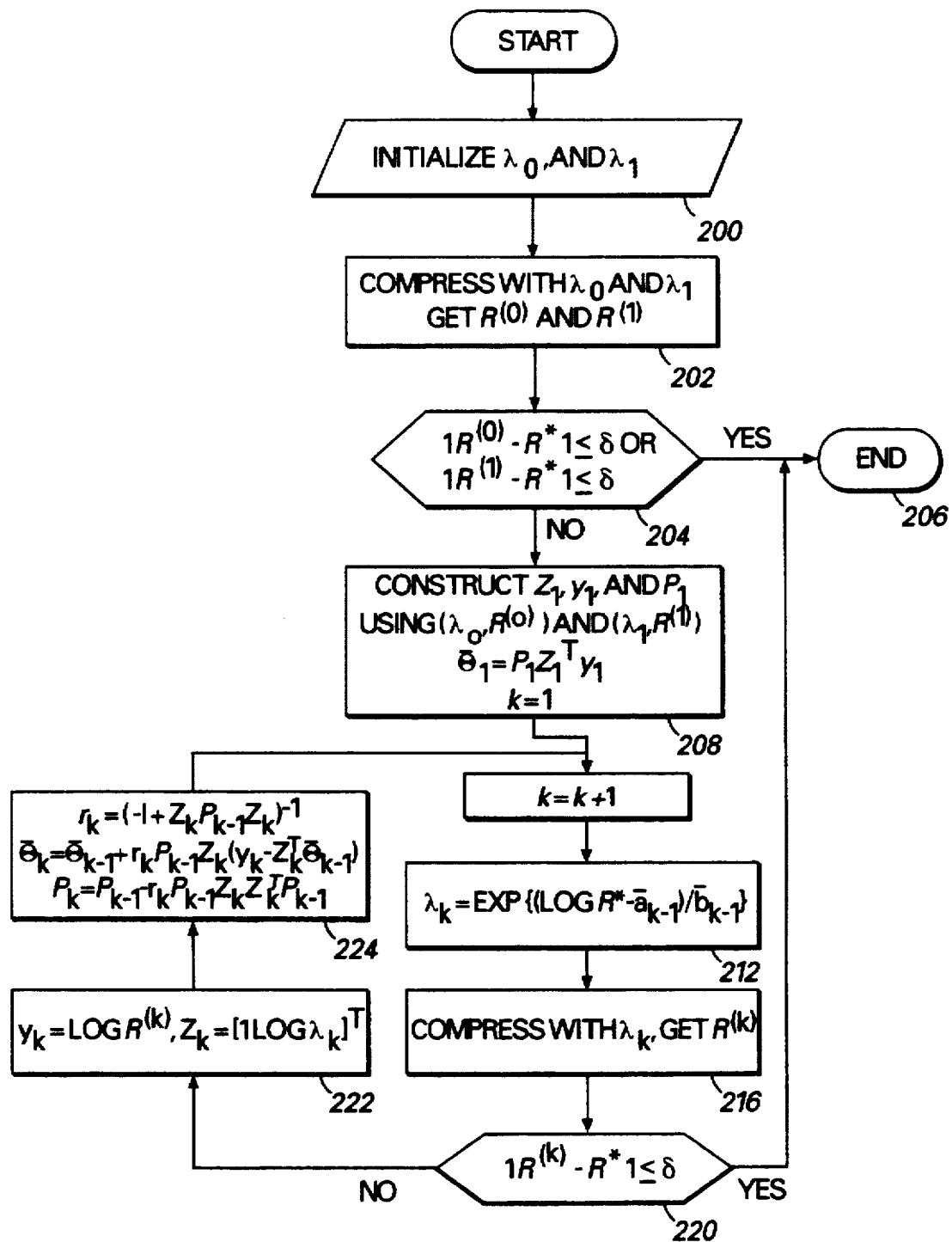
FIG. 5 is a flow chart of a sequential least squares fitting method of the present invention implemented for a compressor which iteratively compresses an original data set.

The last three equations may be used to generate the process for determining new values for $\lambda$ shown in FIG. 5.

The process begins by initializing $\lambda_0$ and $\lambda_1$ parameters (Block 200) and then compressing a data set using both parameters (Block 202). If the resulting file size of either compressed representation is within the $\delta$ range about the target file size R* (Block 204), an acceptable compression has been achieved and the process terminates (Block 206). Otherwise, the $Z_1$, $y_1$ and $P_1$ vectors are initialized with the $\lambda_0$, $\lambda_1$, $R_0$ and $R_1$ values (Block 208). The estimated vector $\Theta_1$ for the a and b values is then computed and loop count is initialized to 1 (Block 208). The next value of $\lambda$ is then computed using the non-linear relationship (Block 212) and the data set is compressed using that value (Block 216). If the file size is within the range about the target file size, the process terminates (Block 220). Otherwise, the vectors corresponding to the current cost parameter and corresponding compressed representation are determined (Blocks 222) and the parameters of the non-linear relationship updated (Box 224). The process continues until a compressed representation having an acceptable file size is generated. This method simplifies the determination of the cost parameter from the non-linear relationship by using $P_{k-1}$ and $\Theta_{k-1}$ to provide information regarding previously determined cost parameters and corresponding sizes. Consequently, the cost parameter for a current compressed representation and its size may be used to generate $P_k$ and $\Theta_k$. These are, in turn, used to estimate new parameters a and b for the non-linear relationship so a new cost parameter may be determined.

Figure 6:
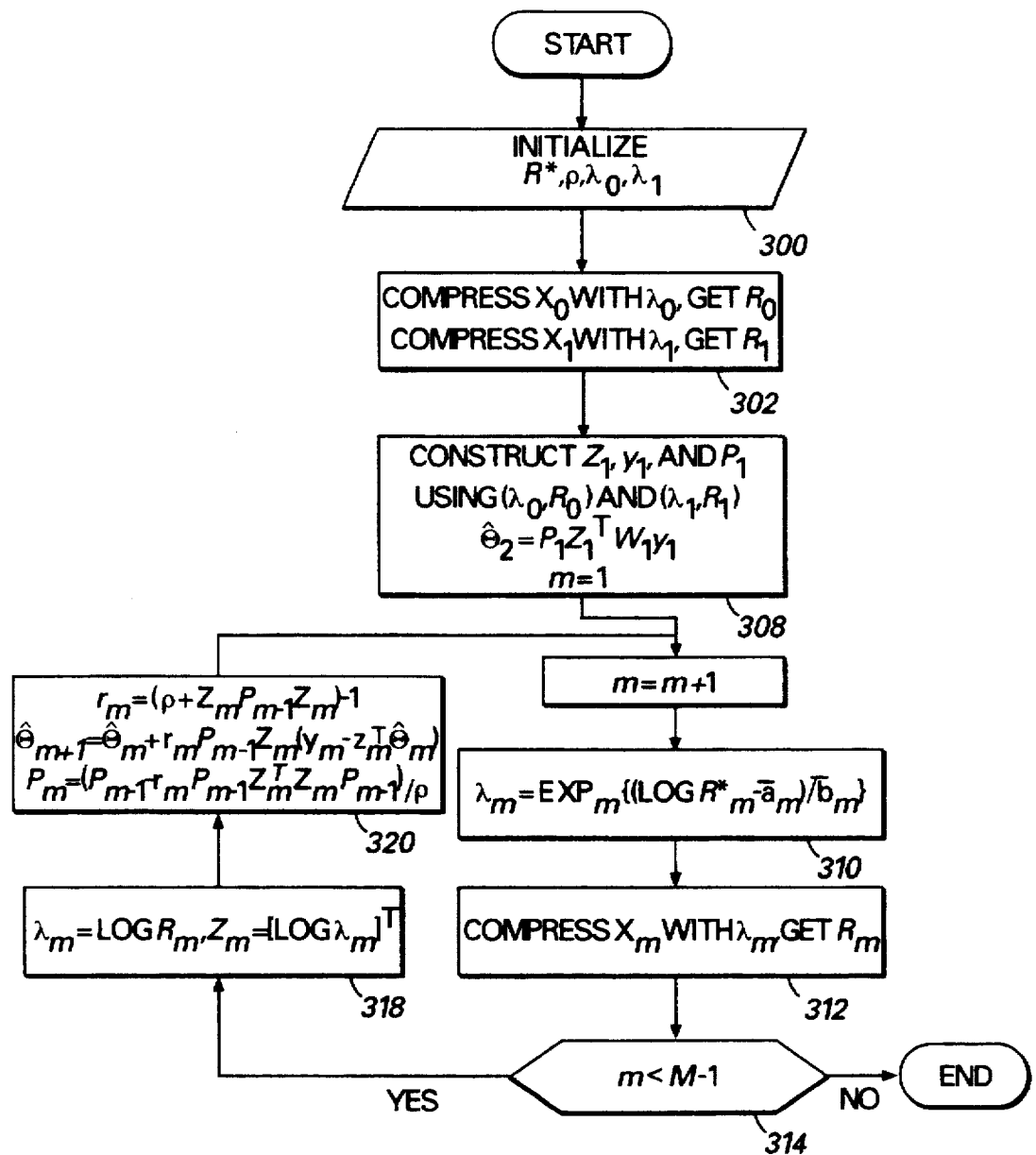
FIG. 6 is a flow chart of a weighted sequential least squares fitting method of the present invention which adjusts the cost parameter following compression of a data set or component of a data set.

For real-time applications, the sequential process shown in FIG. 6 is used since multiple compressions of a data set usually cannot be performed in the time between data sets. Assuming that the non-linear relationship between the cost parameter and compressed representation size is similar from component to component or data set to data set in a sequence, a cost parameter for a next component or data set may be generated from previously generated costs parameters and corresponding compressed representation sizes using a least squares method without iteratively processing the component or data set. Suppose that a data set is composed of m+1 components. Using the notation discussed above with respect to the iterative process, the $(Z_i, y_i)$ values for the $m_i$ components where $i=0, 1, 2, \ldots, m$ may be expressed as the minimization of:

$$\text{minimize } \sum_{i=0}^{m} \rho^{i-m}(y_i - a_{m+1} - b_{m+1} z_i)^2, 0 < \rho \leq 1$$
$$a_{m+1} b_{m+1}$$

Where $\rho$ is a damping factor. This damping factor is used to increase the contribution of more recently determined cost parameters and compressed representation sizes in the least-squares fitting determination. The term "recent" refers to a temporal or spatial proximity. That is, the cost parameters and compressed representation sizes for components in the spatial neighborhood of a component or data set to be compressed may be given more weight than more distant components or data sets. In the temporal sense, components of data sets more recently compressed may be given more weight than cost parameters and corresponding sizes for components or data sets less recently compressed. The predicted values $(a_{m+1}, b_{m+1})$ values for the minimization problem may be expressed as:

$$\Theta_{m+1} = (Z_m^T W_m Z_m)^{-1} Z_m^T W_m y_m$$

where $$\Theta_{m+1} = [a_{m+1}, b_{m+1}]^T$$

-continued $$y = \lfloor y_0 y_1 y_2 \cdots y_m \rfloor^T$$

$$Z = \begin{bmatrix} 1 & 1 & 1 & \cdots & 1 \\ z_0 & z_1 & z_2 & \cdots & z_m \end{bmatrix}^T$$

$$W_m = diag|\rho^m \rho^{m-1} \cdots \rho^1|^T$$

and ~ denotes predicted values.

Of course, this representation of the problem requires the storage of all previously determined cost parameters and compressed representation sizes in order to determine the next cost parameter for compressing a component or data set. To reduce the computational resources required to compute the next cost parameter, the weighted least-square solution may be rearranged using the identity:

$$P_m = (Z_m^T W_m Z_m)^{-1}$$

To derive:

$$r_m = (\rho + z_m^T P_{m-1} z_m)^{-1}$$

$$\tilde{\Theta}_{m+1} = \tilde{\Theta}_m + r_m P_{m-1} z_m (y_m - z_m^T \tilde{\Theta}_m)$$

$$P_m = (P_{m-1} - r_m P_{m-1} z_m z_m^T P_{m-1})/\rho$$

Where $z_m = \lfloor 1 \; z_m \rfloor T$. These equations may be implemented so a correction term for the predicted parameters corresponding to a proceeding component or data set may be generated from a cost parameter and measured compressed representation size for a current compressed component or data set.

A process for implementing the weighted sequential least-squares method is shown in FIG. 6. The process begins by initializing the target size R*, the weighting factor $\rho$ and the cost parameters $\lambda_0$ and $\lambda_1$ (Block 300). A first data set and second data set are compressed with $\lambda_0$ and $\lambda_1$, respectively (Block 302). The $Z_1$, $y_1$ and $P_1$ vectors are initialized by using the $\lambda_0$, $\lambda_1$, $R_0$ and $R_1$ values and these are used to determine estimated parameters for the non-linear relationship (Block 308). The corresponding cost parameter from these initial parameters is then computed (Block 310) and used to compress a component or data set (Block 312). If another component or data set remains for compression (Block 314), the vectors for the current cost parameter and corresponding compressed representation size are updated (Block 318) and the parameters for the non-linear relationship updated (Block 320). Using these values, the next cost parameter is computed (Block 310) and used to compress the next component or data set (Block 312). This process continues until all of the components or data sets have been compressed. An important element of this method is the use of the $\rho$ factor so the more recent cost parameters and compressed representation sizes contribute more to the cost parameter determination. Use of the $\rho$ factor prevents the matrices used in the sequential method from over-filtering or attenuating recent data with data from components or data sets which are distant from the current component or data set in a temporal or spatial sense. This weighting factor may be used in a similar manner with a least squares method and is denoted as a weighted least squares method.

The iterative and various sequential methods for computing a new $\lambda$ may also be used with other non-linear relationships such as the $\alpha+\beta\lambda^{-1}+\gamma\lambda^{-2}+n\lambda^{-3}$ relationship previously noted. While all of the methods have been discussed as operating on data sets, the reader should understand that the term data set includes a data set, components of a data set, or related components of two or more different data sets. For example, a $\lambda$ value may be established for different components of a data set, such as particular areas of an image, and the $\lambda$ value for each area used to compress the corresponding area in another data set. In this manner, $\lambda$ may be specifically adapted for particular types of data within in a data set. Likewise, the target size used for each area may differ as long as they are related to an overall target size. For example, the target size for an area of a data set which is relatively simple and redundant in data content may use a relatively small target size while a more complex and detailed area may have a higher target size. This permits the detailed area to use more of the available overall target size since the simpler areas do not require as much data for an adequate representation as the more detailed areas. The method and system of the present invention permit the compressor to effectively operate in more than one area of the $\lambda$-R relationship which corresponds to the target size for each area.

While the present invention has been illustrated by a description of various embodiments and processes, and while the embodiments and processes have been described in considerable detail, it is not the intention of the applicant to restrict or in any way limit the scope of the appended claims to such detail. Additional advantages and modifications will readily appear to those skilled in the art. For example, while the non-linear relationship has been described as relating cost parameter and compressed representation size it may instead relate distortion and the cost parameter. Consequently, target distortion values may be used in such a system and method to adjust the cost parameter.

What is claimed:

1. A method for controlling the size of a compressed representation of a data set comprising the steps of:

selecting a predetermined parameterized non-linear relationship between compressed representation size and a cost parameter;

selecting a cost parameter value for said cost parameter;

compressing an original data set using said cost parameter to determine cost measurements for determining a best compressed representation;

measuring said size of said best compressed representation generated by said compressing step;

determining a set of parameters for said parameterized relationship from said first cost parameter and said measured compressed representation size;

adjusting said cost parameter value in correspondence to said determined parameters for said parameterized relationship; and continuing said compressing, measuring, determining and adjusting steps until said measured size of said compressed representation corresponds to a target size.

2. The method of claim 1 further comprising the steps of:

segmenting said original data set into a plurality of components;

said compressing step compresses a component of said original data set; and said compressed representation measurement step and said cost parameter adjusting step are performed following compression of at least one of said components so that said cost parameter is adjusted prior to compression of another component of said original data set.

3. The method of claim 2 wherein said compressed representation measurement step and said cost parameter adjustment step is performed between compression of each component of said original data set.

4. The method of claim 3, said determining said parameters step further comprises the step of:

fitting said measured compressed representation sizes and corresponding cost parameters for previously compressed components of said original data set to said selected non-linear relationship.

5. The method of claim 4 wherein said curve relationship corresponds to $R=\alpha\lambda^\beta$ where R is said measured compressed representation size, $\lambda$ is said cost parameter and $\alpha$ and $\beta$ are parameters for said curve relationship which are determined by fitting said measured compressed representation sizes and cost parameters for previously compressed components of said original data set to said non-linear relationship.

6. The method of claim 5 wherein said fitting is a weighted least-squares fitting.

7. The method of claim 5 wherein said fitting is a sequential least-squares fitting.

8. The method of claim 5 wherein said fitting is a weighted sequential least-squares fitting.

9. The method of claim 5 wherein a first cost parameter and corresponding measured compressed representation size for a first component are related to a second cost parameter and corresponding measured compressed representation size for said first component as: $l_1*\lambda_1^n=l_2*\lambda_2^n=K$ where K is a constant, $l_1$, $l_2$ are said first and said second measured compressed representation sizes for said first component, respectively, and $\lambda_1$, $\lambda_2$ are said corresponding cost parameters for said first and said second measured compressed representation sizes, respectively; and further comprising the steps of:

selecting initial values for $\lambda_1$, n and $l_T$ where $l_T$ corresponds to said target size;

compressing said first component using said initial value for $\lambda_1$;

measuring said first compressed representation size $l_1$;

adjusting said second cost parameter as $\lambda_2=\lambda_1*(l_1/l_T)^{1/n}$;

compressing said first component using said second cost parameter;

measuring said second compressed representation size $l_2$;

computing said exponent n using said first and said second compressed representation sizes and corresponding cost parameters according to the relationship: $n=(\log(l_1)-\log(l_2))/(\log(\lambda_2)-\log(\lambda_1))$;

adjusting said cost parameter according to $\lambda=\lambda_2*(l_2/l_1)^{1/n}$ where n is the computed exponent; and using said adjusted cost parameter to compress said other components of said original data set.

10. The method of claim 4 wherein said curve relationship corresponds to $R=\alpha+\beta\lambda^{-1}+\gamma\lambda^{-2}+\eta\lambda^{-3}$ where R is said measured compressed representation size, $\lambda$ is said cost parameter and $\alpha,\beta,\gamma$ and $\eta$ are positive, non-zero parameters for said non-linear relationship which are determined by fitting said measured compressed representation sizes and cost parameters for previously compressed components of said original data set to said non-linear relationship.

11. The method of claim 4 wherein said fitting is a least-squares fitting.

12. The method of claim 2 wherein said plurality of components are associated into groups and each group of components has a corresponding cost parameter used to compress said components in one of said groups.

13. The method of claim 12 wherein said adjusted cost parameter used to compress one of said group of components in said original data set is used to compress a corresponding group of components in another original data set.

14. The method of claim 1 wherein said compression step compresses said original data set using a lossy compression method.

15. The method of claim 14 wherein said compression step lossy compresses said original data set using one of a fractal, wavelet, motion compensation, discrete cosine transform, spline and piecewise polynomial compression method.

16. The method of claim 1 wherein said target size corresponds to a transmission rate for a communication conduit.

17. A system for generating compressed representations of an original dataset corresponding to a target file size comprising:

a compressor that compresses data sets using a lossy method and a cost parameter to evaluate a best compressed representation;

a file size evaluator for measuring a size of a compressed representation generated by said compressor;

a parameter generator for generating parameters for a predetermined parameterized non-linear relationship between said cost parameter and said measured compressed representation sizes; and a cost parameter adjuster for adjusting a cost parameter in correspondence to said generated parameters for said predetermined parameterized relationship so that said adjustment of said cost parameter causes said compressor to generate costs which modify operation of said compressor so that the size of said compressed representations generated by said compressor correspond to said determined parameters for said predetermined parameterized relationship.

18. The system of claim 17 wherein said parameter generator generates parameters by fitting said measured compressed representation sizes and cost parameters for previously compressed data sets to said non-linear relationship.

19. The system of claim 18 wherein said parameter generator generates parameters by fitting said measured compressed representation sizes and cost parameters for previously compressed data sets to said non-linear relationship which corresponds to $R=\alpha\lambda^\beta$ where R is said measured compressed representation size, $\lambda$ is said cost parameter and $\alpha$ and $\beta$ are parameters for said non-linear relationship.

20. The system of claim 18 wherein said parameter generator generates parameters by fitting said measured compressed representation sizes and cost parameters for previously compressed components of said data sets to said non-linear relationship which corresponds to $R=\alpha+\beta\lambda^{-1}+\gamma\lambda^{-2}+\eta\lambda^{-3}$ where R is said measured compressed representation size, $\lambda$ is said cost parameter and $\alpha,\beta,\gamma$ and $\eta$ are positive, non-zero parameters for said non-linear relationship.

21. The system of claim 18 wherein said fitting for generating said parameters is a least-squares fit.

22. The system of claim 18 wherein said fitting for generating said parameters is a weighted least-squares fit.

23. The system of claim 18 wherein said fitting for generating said parameters is a sequential least-squares fit.

24. The system of claim 18 wherein said fitting for generating said parameters is a weighted sequential least-squares fit.

25. The system of claim 18 wherein said compressor compresses said data sets using a lossy compression method.

26. The system of claim 18 wherein said compressor lossy compresses said data sets using one of a fractal, wavelet, motion compensation, discrete cosine transform, spline and piecewise polynomial compression method.

* * * * *

UNITED STATES PATENT AND TRADEMARK OFFICE
CERTIFICATE OF CORRECTION

Page 1 of 2

PATENT NO. : 5,790,131
DATED : August 4, 1998
INVENTOR(S) : Liang et al.

It is certified that error appears in the above-identified patent and that said Letters Patent is hereby corrected as shown below:

Column 13, formula number 2 should read:

$$\widetilde{\Theta} = (Z^T Z)^{-1} Z^T y_1$$

Column 13, formula number 3 should read:

$$\widetilde{\Theta} = \left[\widetilde{a}, \widetilde{b}\right]^T,$$

Column 13, formula number 6 should read:

$$\widetilde{\Theta}_k = \left[\widetilde{a}_k \widetilde{b}_k\right]^T$$

Column 14, formula at line 66 should read:

$$\widetilde{\Theta}_{m+1} = \left[\widetilde{a}_{m+1} \; \widetilde{b}_{m+1}\right]^T$$

UNITED STATES PATENT AND TRADEMARK OFFICE
CERTIFICATE OF CORRECTION

PATENT NO. : 5,790,131
DATED : August 4, 1998
INVENTOR(S) : Liang et al.

It is certified that error appears in the above-identified patent and that said Letters Patent is hereby corrected as shown below:

Column 15, formula at line 5 should read:

$$Z_m = \begin{bmatrix} \frac{1}{z_0} & \frac{1}{z_1} & \frac{1}{z_2} & \cdots & \frac{1}{z_m} \end{bmatrix}^T$$

Signed and Sealed this

Twenty-ninth Day of December, 1998

Attest:

BRUCE LEHMAN

Attesting Officer

Commissioner of Patents and Trademarks